Nov. 6, 1951   D. O. ELLIOTT   2,574,024
AIR HEATING FURNACE DOME CONSTRUCTION
Filed April 22, 1947
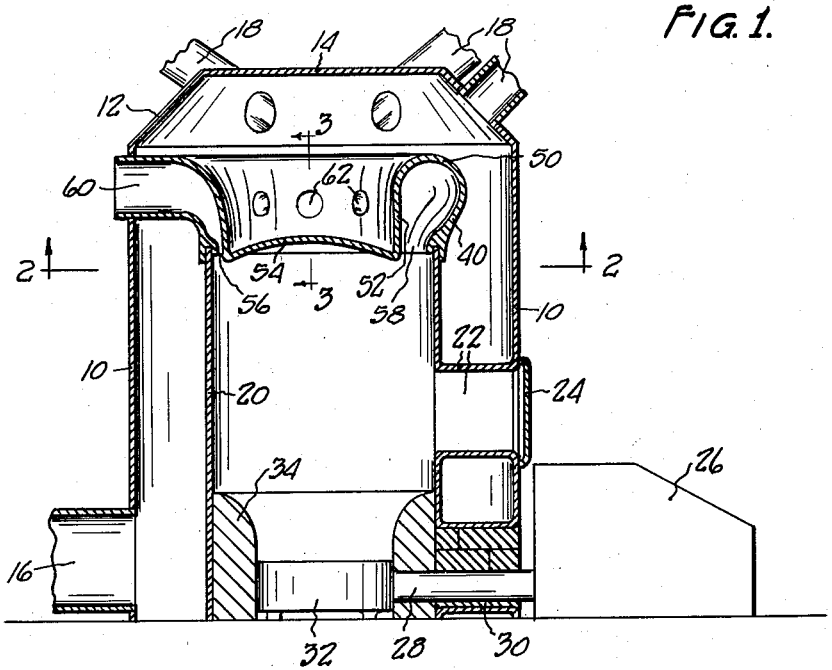
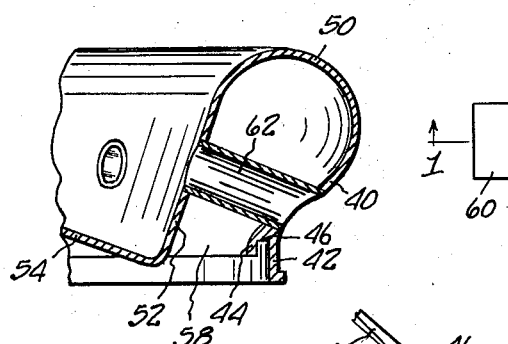
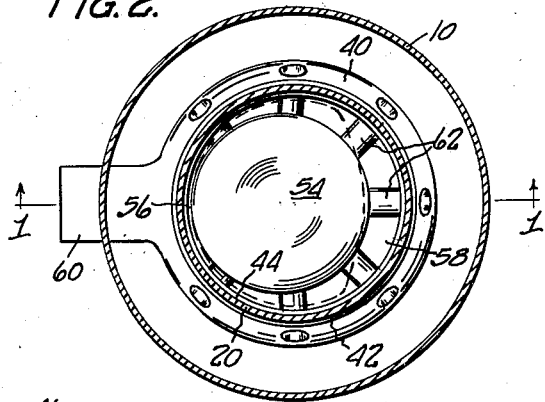
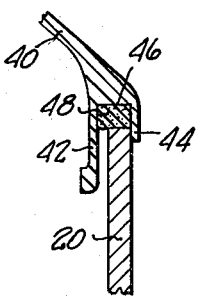
DANIEL O. ELLIOTT.
INVENTOR.
BY Oltsch + Knoblock
ATTORNEYS.

Patented Nov. 6, 1951

2,574,024

UNITED STATES PATENT OFFICE 2,574,024

AIR HEATING FURNACE DOME CONSTRUCTION

Daniel O. Elliott, South Bend, Ind.

Application April 22, 1947, Serial No. 743,162

1 Claim. (Cl. 126—106)

This invention relates to improvements in furnace dome constructions, and particularly to the dome or radiator construction of a hot air space heating furnace.

The primary object of the invention is to provide a simple and inexpensive furnace dome construction which is easy to manufacture and install and which provides for an efficient heat transfer within the furnace.

A further object is to provide a dome or bonnet for a furnace combustion chamber, which dome includes an annular chambered portion of substantially uniform cross-sectional area into which the products of combustion pass from the combustion chamber for outlet at a stack, wherein the opening between the combustion chamber and the chambered portion is restricted adjacent to said stack and is of greatest size at a point remote from said stack.

A further object is to provide a furnace dome construction of large surface area and so shaped and constructed as to be substantially uniformly heated circumferentially thereof so that a high heat transfer efficiency is obtained.

A further object is to provide a furnace dome constructed to form an efficient heat radiator of large surface area which provides a long circuitous path of travel for products of combustion passing from a combustion chamber to an outlet stack without entailing or introducing any restriction which tends to reduce the natural draft of the furnace.

A further object is to provide a furnace dome construction which prevents the accumulation or lodgment therein of soot and fly ash, which is substantially self-cleaning, and in which soot or other partially burned products of combustion are exposed to the flame and heat of combustion to completely burn the same before passing to the stack outlet.

Other objects will be apparent from the following specification.

In the drawing:

Fig. 1 is a vertical sectional view of a furnace taken on line 1—1 of Fig. 2 and illustrating the novel furnace dome construction.

Fig. 2 is a horizontal transverse sectional view taken on line 2—2 of Fig. 1.

Fig. 3 is an enlarged fragmentary sectional view of the furnace dome construction taken on line 3—3 of Fig. 1.

Fig. 4 is a fragmentary detail sectional view illustrating the manner in which the dome is mounted upon the combustion chamber.

Referring to the drawings which illustrate the preferred embodiment of the invention, the numeral 10 designates the vertical walls of a furnace casing which is preferably of cylindrical form, although it may be of any other shape found suitable and desirable. The upper end portion of the furnace casing is tapered at 12 and a top wall 14 spans the top of the casing. One or more cold air inlet ducts 16 communicate with the furnace casing adjacent the lower end thereof, and a plurality of hot air ducts 18 communicate with the upper end of the casing preferably at the tapered portion 12 at the top thereof. The ducts 16 and 18 communicate with the space to be heated in the manner well known in the art to permit the convection flow of air between the furnace and the space to be heated. In other words, cold air from the space to be heated passes by gravity through the cold air duct 16 where it is heated and passes upwardly for discharge through the hot air ducts 18.

A combustion chamber or fire box 20 is positioned within the furnace casing, being of smaller size than said casing and substantially centrally positioned therein, whereby a free and unrestricted passage of air is permitted therearound. This combustion chamber has communication with an access passage defined by the walls 22 which span the space between the same and the casing 10, said access passage being open at its outer end and adapted to be closed by the usual fire door 24. As here shown, the furnace is intended to be fired by a stoker 26 having a fuel tube 28 which extends through a refractory liner 30 and opens into a suitable retort 32 within the combustion chamber at its lower end. The interior of the combustion chamber is preferably lined with a refractory 34 encircling the retort 32. It will be understood, however, that the furnace may be provided with conventional grates in case it is to use solid fuel and to be hand fired, or that the furnace may be provided with suitable means for burning oil or gas, if desired. The combustion chamber as shown herein is preferably of cylindrical form and is illustrated as being of welded sheet steel construction. It will be understood, however, that any other type of combustion chamber, such as a cast metal chamber of suitable vertical configuration, may be employed. The upper end of the chamber walls terminate in a horizontal plane spaced below the tapered portion 12 of the casing.

My improved furnace dome construction is preferably formed of cast metal and is provided with an annular lower marginal groove fitting around the upper edge portion of the combustion chamber in the manner best illustrated in Fig. 4. Thus the outer wall 40 of the dome has a cylindrical outer flange 42 of slightly greater diameter than the combustion chamber 20 and a concentric inner depending flange 44 whose outer diameter is preferably substantially equal to the inner diameter of the combustion chamber 20. A transverse bearing surface 46 is formed in the outer wall between the inner ends of the flanges 42 and 44. An annular member 48 preferably formed of asbestos fits within the inverted annular groove defined by the flanges 42 and 44 to bear against the upper edge of the combustion chamber 20 and to be engaged by the surface 46. The member 48 may be formed of any suitable material and, if desired, may comprise a conventional plastic furnace cement of thick consistency permitted to substantially take a set before the dome is inserted on the combustion chamber but having sufficient fluidity to insure an effectively sealed joint between the combustion chamber and the dome. It will be noted that the thickness of the sealing ring 48 is less than the depth of the groove which receives it, so that the combustion chamber projects into said groove and the member 48 is effectively retained against extrusion. The width of the groove is preferably greater than the thickness of the wall of the combustion chamber 20 to accommodate expansion of the metal incident to operation of the furnace.

The outer wall of the dome preferably flares upwardly and outwardly and merges with an inwardly curved upper portion 50 which in turn merges with an inner wall 52 so that the cross-sectional shape of the marginal portion of the dome is substantially the shape of an inverted U having a restricted mouth. The inner walls 52 may extend either vertically, as shown in Fig. 1, or at a slight inclination as shown in Fig. 3, and preferably terminate at approximately the same level as the margin of the dome. A central plate portion 54, which may be slightly dished upwardly as shown, spans the lower edge of the annular inner wall 52 of the dome. The inner substantially cylindrical wall 52 is positioned off-center with respect to the marginal portion of the dome, as best illustrated in Figs. 1 and 2. The eccentricity of these parts is preferably such that only a very narrow passage 56 exists between the marginal flange 44 and said wall 52 at one position, and the size of said passage increases progressively circumferentially to a much greater width at the diametrically opposed portion 58 at which the width of the passage is approximately one-half of the major spacing between wall portions 40 and 52, as best seen in Figs. 1 and 3. A tubular smoke outlet 60 projects radially outwardly from the dome at the radius of the device coinciding with the minimum passage width 56 as shown in Figs. 1 and 2, and said portion extends through the casing 10 whereby it is adapted for connection with the usual stack or smoke outlet pipe (not shown).

It will be apparent that as combustion occurs within the combustion chamber, the products of combustion pass upwardly into the annular chambered marginal portion of the dome. The shape of the opening substantially restricts the passage of the products of combustion into the chambered part of the dome adjacent to the outlet 60. Therefore, the major portion of the products of combustion enter said chambered dome portion remote from the outlet 60 and thence travel circumferentially through the dome outlet 60. This insures uniform heating of the dome circumferentially and provides a circuitous path of travel for the products of combustion. It will be noted, however, that the total area of the passage between the combustion chamber and the chambered dome portion is greater than the cross-sectional area of either the outlet 60 or the chambered dome portion defined by the walls 40, 50 and 52, so that no restriction of lesser cross-sectional area than the smoke outlet need occur if the cross-sectional area of the chambered portion defined by the walls 40, 50 and 52 is substantially equal to the cross-sectional area of the stack outlet as is preferred. The circuitous path of travel of the products of combustion, together with the uniform circumferential heating of the dome, provides for a large area of heat transfer surface effectively and uniformly heating all of the air passing upwardly and around the combustion chamber from the cold air intake duct 16 to the hot air outlet ducts 18 regardless of the flow path in the casing 10 which any portion of the air passing therethrough may take. This insures a high efficiency of heat transfer to the air and reduces stack losses. It will be noted that this efficiency is obtained without requiring the use of baffles or any other restrictions as are frequently employed to increase heat transfer.

One of the outstanding advantages of this furnace dome construction is the fact that the annular marginal chambered portion through which the products of combustion pass to be discharged at the stack outlet 60 is continuous circumferentially and that the walls, including the outward flaring wall 40 of the dome structure, are all so tapered and curved that no ledges, shoulders or pockets are provided within the dome, and, consequently, soot, fly ash and other solid products of combustion entrained in the gaseous products of combustion cannot be trapped within the dome. Any such solid products of combustion which are discharged from the stream of gaseous products of combustion, as upon impingement with the walls of the dome, are permitted to fall by gravity in an unrestricted passage through the opening between the combustion chamber and the dome, whereby the dome has the property of cleaning itself. This promotes high heat transfer efficiency by preventing the collection of soot, ashes and other solid materials in an extent sufficient to insulate the walls of the dome.

Another advantage of the device is that, in the event soot and other partially burned products of combustion adhere to the walls of the chambers of the dome, they are exposed at all times to the full heat of combustion and, in some cases, to the action of the flame burning within the combustion chamber. Consequently, soot impinging or adhering to the walls of the dome is substantially consumed by further combustion thereof which serves the dual purpose of maintaining the dome structure clean and of increasing the efficiency of combustion occurring within the furnace.

The efficiency of heat transfer from the dome to the surrounding air to be heated can be increased by providing a plurality of open ended tubes 62 positioned radially in the dome and spanning and supported at their opposite ends by the outer wall 40 and the inner wall 52 of the chambered portion of the dome, as best illustrated in Figs. 2 and 3. These tubes 62 will extend through the outer marginal dome wall 40 at a position just above the flanged marginal portion thereof, as best seen in Fig. 3, are of varying lengths as is shown in Figure 2, and will preferably be inclined slightly upwardly, whereby the opposite end of the tube passing through the inner wall 52 is at a slightly higher elevation. This inclined position of the tubes 62, coupled with the fact that the lower ends of said tubes are positioned at the outwardly flaring portion of the wall 40, accommodates the passage of a part of the air flowing vertically upwardly in the casing 10 for diversion into the central cup-like space existing within the dome and defined by the walls 52 and 54. The tubes may be of such size and number as to substantially increase heat transfer to the air without restricting flow of the products of combustion through the dome to the stack outlet 60. In this connection it will be apparent that, if the cross-sectional size of the chambered annular portion of the dome is substantially equal to the cross-sectional size of the stack outlet 60, the effect of tubes 62 of approximately the size and proportion shown in Fig. 3 will not restrict the flow of products of combustion through the dome because the restriction is very small compared to the total cross-sectional area of the dome portion defined by the walls 40, 50 and 52 and because two separate paths of flow occur within the dome to converge at the stack outlet 60. It will be apparent from a consideration of Fig. 2 that the draft within the stack is divided at the junction between the stack and the dome. Consequently, as viewed in Fig. 2, those products of combustion which enter the dome at the portions shown at the upper part of said figure will flow counter-clockwise through the dome toward the outlet passage 60, whereas that portion of the products of combustion which enters the dome portions shown at the lower part of Fig. 2 will flow clockwise through the dome to the smoke outlet 60. Thus the dome has an effective area twice that of its physical dimensional area and, when the restrictions provided by the tubes 62 are of the small size shown, the total unrestricted effective area of the two opposite parts of the dome passages will be greater than the cross-sectional area of the stack, and the full draft effect occurring in the stack will act and be effective in the combustion chamber to insure efficient combustion.

While the preferred embodiment of the invention has been illustrated and described herein, it will be understood that changes may be made therein within the scope of the appended claim without departing from the spirit of the invention.

I claim:

A hot air heating furnace comprising a fire box having a combustion chamber therein, a heat radiating dome mounted on the upper end of the fire box and spanning said combustion chamber, said dome comprising a circumferential marginal chambered portion of inverted U-shape in cross section and having inner and outer walls, the outer of said walls being connected at its lower edge to the upper edge of the combustion chamber wall and the inner of said walls having its lower edge spaced inwardly of said combustion chamber wall, the lower portions of said inner and outer walls converging towards each other thereby forming a restricted annular passage for products of combustion to the marginal chambered portion, a central panel carried by the lower edge of the inner wall of the marginal chambered portion and closing the top of the combustion chamber, said inner wall being eccentrically disposed with respect to the outer wall, said outer wall having a stack outlet disposed at the point of minimum spacing between said inner and said outer walls, and a plurality of tubes substantially radially disposed connecting and opening through the inner and outer walls of the dome adjacent the lower side of the marginal chamber, said tubes decreasing in length as they approach the stack outlet, said tubes extending across the marginal chambered portion.

DANIEL O. ELLIOTT.

REFERENCES CITED

The following references are of record in the file of this patent:

UNITED STATES PATENTS

| Number | Name | Date |
| --- | --- | --- |
| 269,873 | Michael | Jan. 2, 1883 |
| 457,250 | Brayer | Aug. 4, 1891 |
| 1,601,171 | Grether | Sept. 28, 1926 |
| 1,777,171 | Landrus | Sept. 30, 1930 |